United States Patent
Gauthier

(10) Patent No.: US 6,360,834 B1
(45) Date of Patent: Mar. 26, 2002

(54) HYBRID ELECTRIC VEHICLE

(75) Inventor: Greg Edward Gauthier, Dearborn, MI (US)

(73) Assignee: Ford Global Tech., Inc., Dearborn, MI (US)

(*) Notice: Subject to any disclaimer, the term of this patent is extended or adjusted under 35 U.S.C. 154(b) by 0 days.

(21) Appl. No.: 09/616,344

(22) Filed: Jul. 14, 2000

(51) Int. Cl.$^7$ .............................. F16H 3/72; B60K 1/00
(52) U.S. Cl. .................... 180/65.2; 180/53.5; 475/5; 477/5; 318/139
(58) Field of Search .................. 180/65.2, 65.8, 180/54.1, 65.1, 53.1, 53.5; 475/5, 1, 6, 8; 477/2, 3, 5, 6; 701/112; 318/139

(56) References Cited

U.S. PATENT DOCUMENTS

| 4,588,040 | A | * | 5/1986 | Albright, Jr. et al. ...... 180/65.4 |
| 5,558,588 | A | * | 9/1996 | Schmidt ................. 180/65.2 X |
| 5,669,842 | A | * | 9/1997 | Schmidt ......................... 475/5 |
| 5,931,757 | A | * | 8/1999 | Schmidt ......................... 475/5 |
| 6,006,620 | A | * | 12/1999 | Lawrie et al. ................ 74/335 |
| 6,048,288 | A | * | 4/2000 | Tsujii et al. ................ 475/5 X |
| 6,090,005 | A | * | 7/2000 | Schmidt et al. ................ 475/5 |

FOREIGN PATENT DOCUMENTS

| EP | 0882887 A2 | 12/1998 |
| EP | 0908619 A1 | 4/1999 |
| WO | WO-94/11216 | * 5/1994 |

* cited by examiner

Primary Examiner—Eric Culbreth
Assistant Examiner—F. Zeender
(74) Attorney, Agent, or Firm—Ford Global Tech., Inc.

(57) ABSTRACT

A hybrid vehicle 10 including a power take off assembly 20 which is selectively operated by a source of energy which may comprise the cooperative combination of a battery 22 and a motor 16 while the internal combustion engine 12 is deactivated, thereby allowing for a quiet and efficient operation.

20 Claims, 1 Drawing Sheet

HYBRID ELECTRIC VEHICLE

FIELD OF THE INVENTION

The present invention generally relates to a hybrid vehicle and more particularly, to a hybrid electric vehicle having a power take off portion which is operated by a vehicle battery which selectively receives electrical charge from an internal combustion engine.

BACKGROUND OF THE INVENTION

Hybrid electric vehicles typically include an internal combustion engine and an induction motor (or another type of energy source) which are each respectively adapted to selectively provide torque or rotational energy to a driveshaft. The induction motor is typically operated by the use of an electrical battery.

A hybrid electric vehicle may further include a "power take off" assembly which allows a portion of the provided torque or rotational energy which is coupled to the driveshaft to be used to operate a variety of auxiliary or utility type of assemblies (i.e., a "lift" assembly). Such a hybrid electric vehicle could be used, for example and without limitation, by a wide variety of business enterprises such as an electrical utility enterprise and/or a telephone enterprise which selectively and respectively utilizes these power take off assemblies to power or operate a lift assembly, effective to place an individual in close proximity to a portion of a telephone or power system which is to be repaired or serviced. Other business enterprises may use these power take off assemblies to perform a variety of other operations (e.g., selectively moving a tilt bed).

While hybrid electric vehicles do allow for the selective operation of these power take off assemblies, they require the concomitant and continued operation of an internal combustion engine which "powers" or operates the various assemblies. The internal combustion engine therefore continuously creates undesired noise and undesirably increases overall fuel consumption. Such noise generation is of particular concern to homeowners and other individuals in close proximity to one of these prior vehicles since these power take off assemblies are typically operated for a relatively long period of time in order to allow a necessary repair or other operation to be completed.

There is therefore a need for a hybrid vehicle having a power take off assembly which overcomes at least some of the previously delineated drawbacks associated with the power take off assemblies of prior hybrid vehicles.

SUMMARY OF THE INVENTION

It is a first object of the present invention to provide a hybrid vehicle which overcomes some or all of the previously delineated drawbacks of prior hybrid vehicles.

It is a second object of the present invention to provide a hybrid vehicle which overcomes some or all of the previously delineated drawbacks of prior hybrid vehicles and which selectively and quietly operates a power take off assembly.

It is a third object of the present invention to provide a hybrid electric vehicle which overcomes some or all of the previously delineated drawbacks of prior hybrid electric vehicles and which includes a power take off portion or component which is cooperatively operated by a battery and an induction motor.

It is a fourth object of the present invention to provide a method for operating a power take off assembly which overcomes some or all of the previously delineated drawbacks of prior power take off operating methods.

According to a first aspect of the present invention, a hybrid vehicle is provided and includes a battery; a motor which selectively receives electrical power from the battery; and a power take off assembly which is coupled to the motor and which is selectively operated by the motor.

According to a second aspect of the present invention, a power take off assembly is provided for use within a hybrid vehicle of the type having an internal combustion engine and a second source of energy. The power take off assembly comprises a power take off portion, a clutch assembly which is coupled to the power take off portion and to the second source of energy, and a controller which is coupled to the power take off portion, to the clutch assembly, and to the second source of energy and which selectively deactivates the internal combustion engine while allowing the power take off portion to be solely operated by the second source of energy.

According to a third aspect of the present invention, a method is provided to operate a power take off assembly. The method includes the steps of selectively coupling the power take off assembly to a motor; and selectively energizing the motor, effective to operate the power take off assembly.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
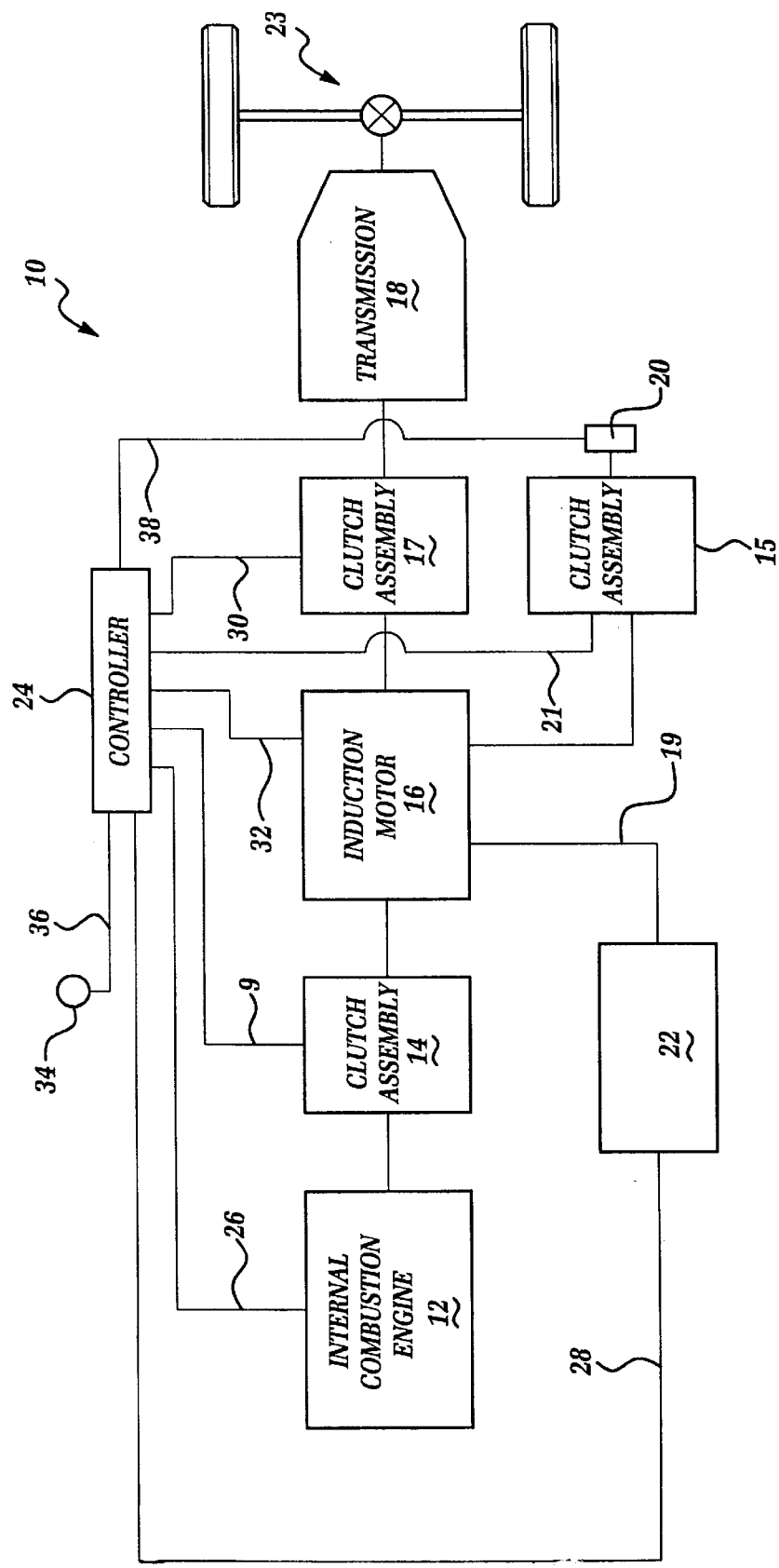
FIG. 1 is a block diagram of the power train portion or assembly of a hybrid electric vehicle which is made in accordance with the teachings of the preferred embodiment of the invention.

Referring now to FIG. 1, there is shown a power train portion or assembly 10 of a hybrid electric vehicle which is made in accordance with the teachings of the preferred embodiment of the invention. It should be realized that while the following discussion describes this selective operation of a power take off assembly within a hybrid electric vehicle, nothing in this Application is meant to limit the invention to use only with such a hybrid electric vehicle. Rather, this invention may be used with a vehicle having energy sources which are dissimilar from those which are shown in FIG. 1. Moreover, this invention is not limited to a particular type of hybrid vehicle, but may be applied to a variety of dissimilar configurations.

Particularly, power train assembly 10 includes an internal combustion engine 12 which is coupled to a clutch or coupling assembly 14. The clutch assembly 14 is coupled to an induction motor 16 and, as shown, the induction motor 16 is coupled to a "forward" and "reverse" clutch assembly 17. Further, assembly 10 includes a transmission 18 which is coupled to and/or which operatively and integrally contains the clutch assembly 17. Transmission 18 is further coupled to wheel and axle assembly 23, by use of a differential, and selectively receives torque from the internal combustion engine 12 and/or from the induction motor 16, by the cooperative operation of clutch assemblies 14, 17, and operatively transfers at least a portion of the received torque to the assembly 23, effective to allow the vehicle to be maneuvered. Assembly 10 further includes a "power take off" portion or component/member 20 which is selectively coupled to the induction motor 16 by clutch assembly 15 and which selectively receives a portion of the torque produced by the induction motor 16, effective to operate a wide variety of utility type assemblies in the manner which is more fully set forth below.

Assembly 10 further includes an electric battery 22 which stores electrical charge and which is physically, communicatively, and controllably coupled to the motor 16 by bus 19, effective to selectively provide electrical power to the motor 16. Electric battery 22 may, in one non-limiting embodiment of the invention, be replaced by a fuel cell assembly. Further, assembly 10 includes a controller 24 which is operable under stored program control and which is physically, communicatively, and controllably coupled to the engine 12 by bus 26, to the clutch assembly 15 by bus 21, to the clutch assembly 14 by bus 9, to the battery 22 by bus 28, to the clutch assembly 17 by bus 30, to the power take off portion 20 by bus 38, and to the induction motor 16 by bus 32. Assembly 10 further includes a selectively depressible control switch 34 which is physically, communicatively, and controllably coupled to the controller 24 by bus 36 and which selectively generates and transmits a "power take off" command signal to the controller 24 upon being selectively depressed. Controller 24, by use of bus 28, monitors the state of electrical charge of battery 22 and stores a charge threshold value which may be "fixed" by a user.

In operation, upon the activation or the selective depression of the switch 34, controller 24 issues a command to the induction motor 16, by bus 32, and causes the battery 22, by bus 28, to communicate electric energy to the motor 16 which is effective to activate the motor 16, thereby causing the motor 16 to generate torque. Further, controller 24 issues another command signal to the clutch assembly 15, effective to cause the clutch assembly 15 to selectively couple the power take off portion 20 to the induction motor 16, thereby causing/allowing the power take off portion 20 to receive torque from the motor 16. Further, controller 24 generates control command signals to the engine 12, effective to cause the engine 12 to become temporarily deactivated if there is sufficient charge in the battery 22. (i.e., if the currently monitored amount of electric charge which is resident within the battery 22 is equal to or greater than the stored charge threshold value). In this manner, the power take off assembly 20 may be quietly operated solely from the cooperative combination of the motor 16 and the battery 22, thereby reducing the amount of generated noise and reducing the amount of fuel which must be utilized during the operation of the power take off assembly 20. The power take off component/portion 20 may become selectively inoperable or "de-energized" upon the re-engagement of the switch 34 (i.e., the placement of the switch 34 in its initial "non-depressed" position). In one non-limiting embodiment, controller 24 may generate a warning signal or deactivate the power take off component 20 if the amount of charge, resident within the battery 22, "falls below" the certain stored value.

It is to be understood that the invention is not limited to the exact construction or method which has been delineated above, but that various changes and modifications may be made without departing from the spirit and/or the scope of the following claims.

Is claimed is:

1. A hybrid vehicle comprising:
   an internal combustion engine;
   a second source of energy having a certain amount of charge;
   a controller which is coupled to said second source of energy; and
   a power take off portion which is coupled to said controller, said controller containing a certain stored value and allowing said power take off portion to be activated only if said certain amount of charge is greater than said certain stored value and deactivating said power take off portion when said certain amount of charge falls below said certain stored value.

2. The hybrid vehicle of claim 1 wherein said power take off portion is only operated by said second source of energy.

3. The hybrid vehicle of claim 2 wherein said second source of energy comprises an electrical battery.

4. The hybrid vehicle of claim 3 wherein said electrical battery has a certain amount of electrical charge.

5. The hybrid vehicle of claim 4 further comprising a clutch assembly which is coupled to a motor and to said controller and which selectively couples said motor to said power take off assembly.

6. The hybrid vehicle of claim 5 further comprising a selectively depressible switch which is coupled to said controller and which generates and transmits a signal to said controller when depressed, effective to cause said controller to cause said power take off portion to be operated by said electrical battery.

7. A power take off assembly for use within a hybrid vehicle of the type having an internal combustion engine and a second source of energy, said power take off assembly comprising:
   a power take off portion;
   a clutch assembly which is coupled to said power take off portion and to said second source of energy; and
   a controller which is coupled to said power take off portion, to said clutch assembly, and to said second source of energy, which selectively deactivates said internal combustion engine while allowing said power take off portion to be solely operated by said second source of energy, and which, when the amount of charge from said second source of energy falls below a certain stored value, said controller deactivates said power take off portion and provides a warning signal.

8. The power take off assembly of claim 7 wherein said second source of energy cooperatively comprises an electrical battery; and an induction motor.

9. The power take off assembly of claim 8 further comprising a selectively depressible switch which is coupled to said controller and which, when depressed, causes said controller to selectively deactivate said internal combustion engine.

10. The power take off assembly of claim 9 wherein said electrical battery has a certain state of charge, and wherein said controller deactivates said internal combustion engine only if said stored value is greater than said certain state of charge.

11. The power take off assembly of claim 7 wherein said second source of energy comprises a fuel cell.

12. The power take off assembly of claim 10 wherein said controller deactivates said internal combustion engine during substantially the entire operation of said power take off assembly.

13. A method to operate a power take off assembly comprising the steps of selectively coupling the power take off assembly to a source of energy; creating and storing a certain value; selectively deactivating an internal combustion engine; monitoring the state of charge of said source of energy; and allowing said power take off portion to be activated by said source of energy only if said state of charge of said source of energy is greater than said certain stored value and deactivating said power take off portion and providing a warning signal when said source of energy falls below said certain stored value.

14. The method of claim 13 wherein said source of energy comprises the cooperative combination of an electrical battery and a motor.

15. The method of claim 14 wherein said internal combustion engine is deactivated during the entire operation of said power take off assembly.

16. The method of claim 15 wherein said electric battery has a varying state of charge, said method further comprising the steps of:

monitoring said varying state of charge.

17. The method of claim 16 further comprising the step of periodically monitoring said state of charge of said battery as said power take off assembly is being operated and selectively deactivating said power take off assembly when said periodically monitored state of charge is below said certain value.

18. The method of claim 17 further comprising the step of providing a selectively depressible switch; and selectively coupling said source of energy to said power take off assembly when said switch is depressed.

19. The method of claim 13 wherein said source,of energy comprises a fuel cell assembly.

20. The method of claim 19 further comprising the step of deactivating said internal combustion engine during the entire operation of said power take off assembly.

* * * * *